Oct. 17, 1961  A. E. SCHMIDLIN ET AL  3,004,444
BALLSCREW AND NUT TRANSMISSION ASSEMBLY
Filed March 3, 1960  2 Sheets-Sheet 1
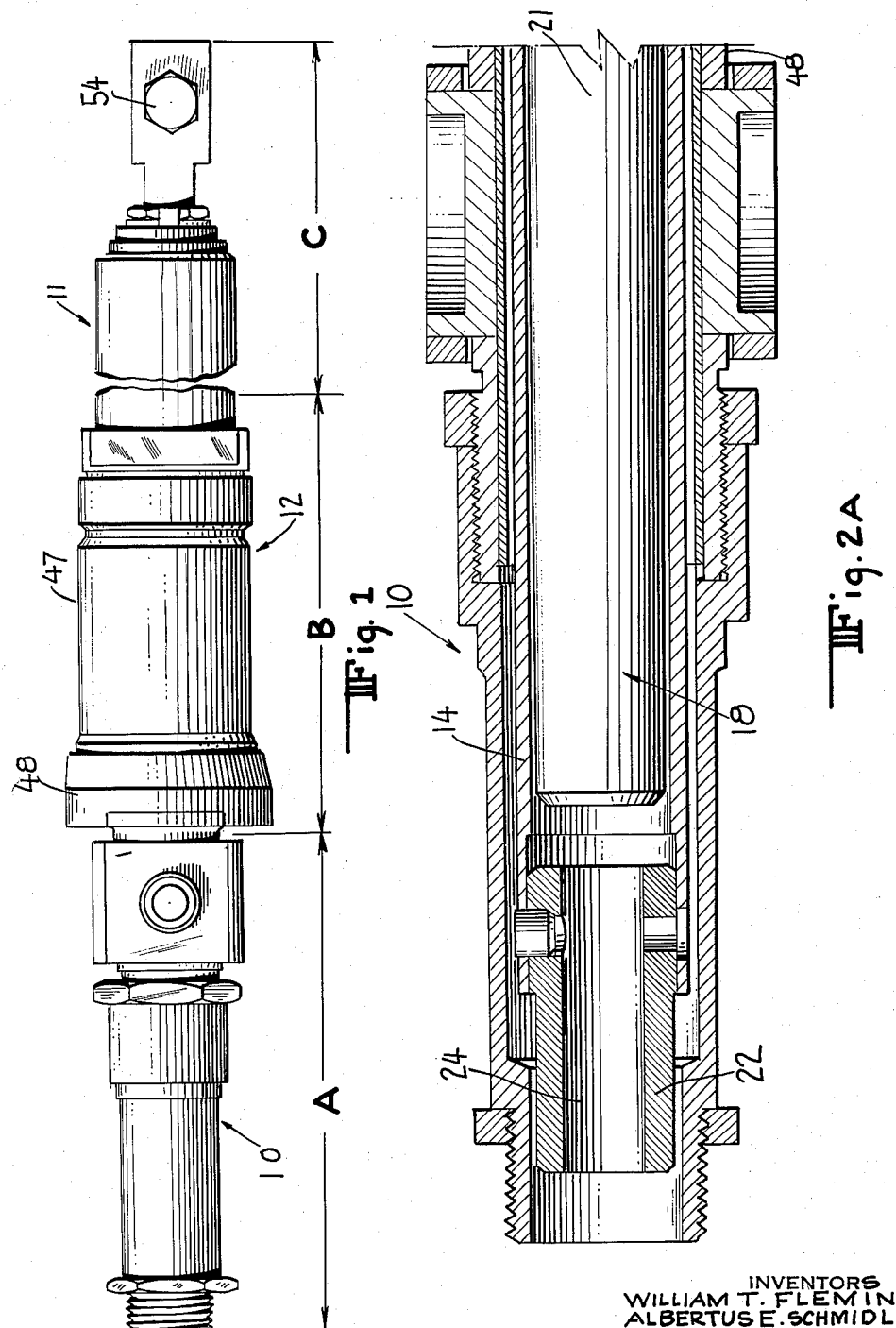
INVENTORS
WILLIAM T. FLEMING
ALBERTUS E. SCHMIDLIN
BY
J. William Carson
ATTORNEY

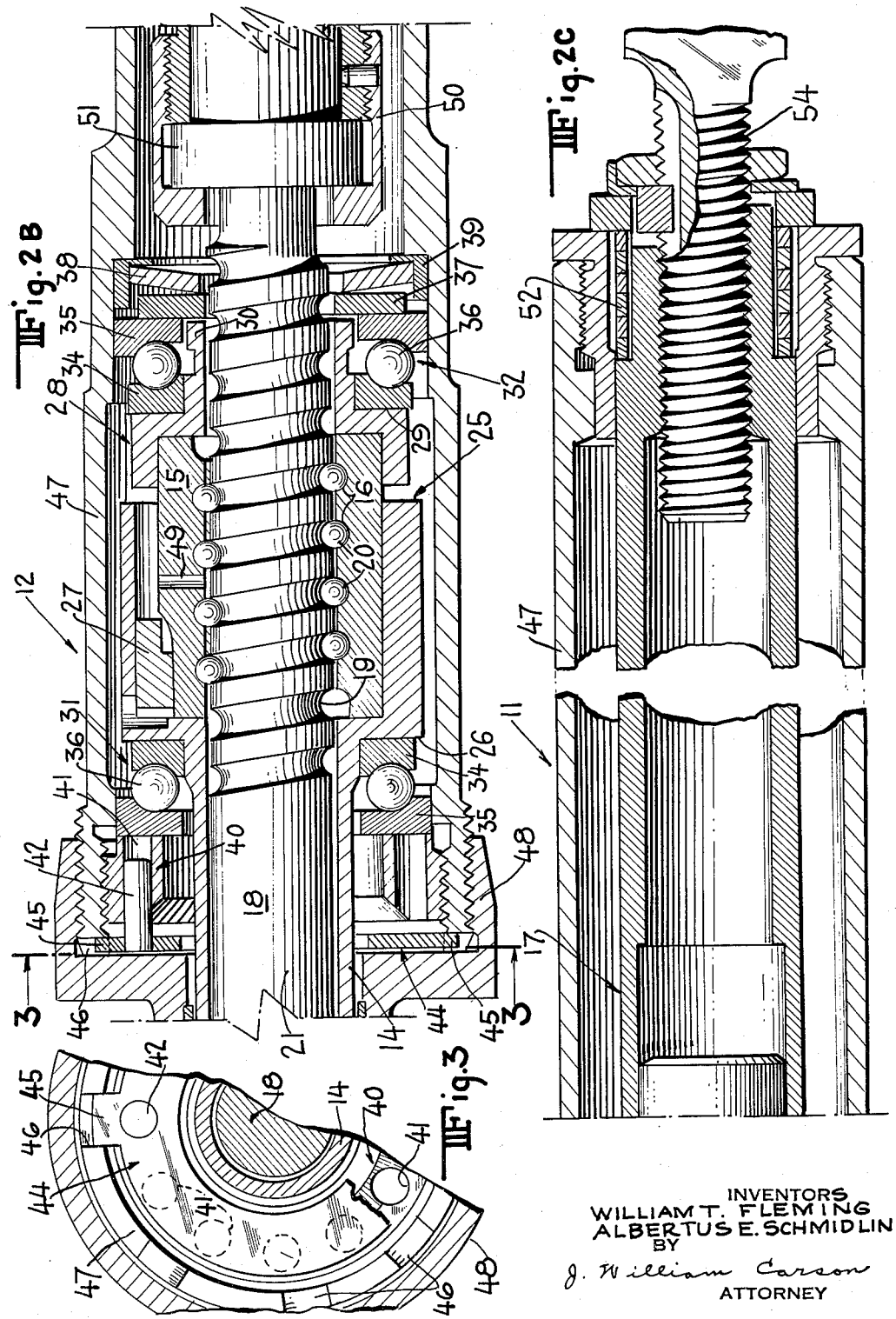

United States Patent Office 3,004,444
Patented Oct. 17, 1961

3,004,444
BALLSCREW AND NUT TRANSMISSION ASSEMBLY
Albertus E. Schmidlin, Caldwell, and William T. Fleming, Boonton, N.J., assignors to Specialties Development Corporation, Belleville, N.J., a corporation of New Jersey
Filed Mar. 3, 1960, Ser. No. 12,605
3 Claims. (Cl. 74—424.8)

The present invention relates to mechanisms, and more particularly, to an improved ballscrew and nut transmission assembly.

Such transmission assemblies generally include a driving connection between complementary helical grooves formed in a nut member and on a screw member which is established by a number of balls disposed in the groove whereby rotation of one member relatively to the other results in linear or relative axial movement between the members with only rolling friction between the screw and nut members. A complete circuit for the balls is provided by crossover passages in the nut member for returning the balls from one end of the helical groove in the nut to the opposite end thereof.

Heretofore, it has been customary to rotate the screw and hold the nut against rotation while effecting linear movement thereof. Attempts have been made to rotate the nut and effect linear movement of the crew, but such attempts have not been successful because various considerations of the loads between the members and dimensional changes caused by localized hot spots due to friction were not taken into account.

Accordingly, an object of the present invention is to provide a ballscrew and nut transmission assembly wherein the nut is rotated which is not subject to any of the difficulties and disadvantages heretofore encountered.

Another object is to provide such an assembly wherein the nut is so positioned that side loads are minimized to prevent twisting moments on the nut.

Another object is to provide such an assembly wherein the helical groove of the nut is shielded at the ends thereof.

Another object is to provide such an assembly wherein the nut is mounted for rotation to prevent malfunctioning due to temperature changes.

Another object is to provide means for adjusting the nut mounting means and means for locking such means in its adjusted position.

Another object is to provide such an assembly wherein foreign matter is ejected from the groove in which the balls travel.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 1 is a fragmentary side elevational view of a ballscrew and nut transmission assembly.

FIGS. 2A, 2B and 2C are enlarged longitudinal sectional views of lengthwise extending portions A, B and C, respectively, of the assembly shown in FIG. 1.

FIG. 3 is a fragmentary sectional view taken along the line 3—3 on FIG. 2B.

Referring to the drawings in detail, there is shown a ballscrew and nut transmission assembly which generally comprises a tubular housing having end sections 10 and 11 (FIGS. 2A, 2C) and an intermediate section 12 (FIG. 2B), a tubular shaft 14 mounted for rotation in the housing section 10 and extending into the intermediate housing section 12, a rotatable nut 15 having a screw groove 16 in the intermediate housing section secured to the shaft 14 for rotation therewith, a shaft 17 mounted for linear movement in the housing section 11, and a spindle 18 secured to the inner end of the shaft 17 having a screw groove 19 at one end cooperating with the screw groove 16 of the nut to provide a path for confining ball bearings 20 and having a cylindrical section 21 at its other end extending into the tubular shaft 14.

The outer end of the shaft 14 (FIG. 2A) has a cylindrical member 22 inserted therein and secured thereto which is formed with a central non-circular bore 24 for receiving an arbor of a rotatable drive shaft (not shown) for effecting rotation of the shaft 14. The inner end of the shaft 14 (FIG. 2B) has an enlarged cup-shaped formation 24 thereon for receiving one end of the nut 15 and providing an annular outwardly facing shoulder 26.

As shown in FIG. 2B, one end of the nut 15 is generally cylindrical and is secured to the cup-shaped formation 25 of the shaft 14 by a key 27 inserted into cooperating slots. The nut may be of any conventional type having ball cross-over passages (not shown), for example such as disclosed in United States Patent No. 2,618,166, November 18, 1952. The other end of the nut fits into and is secured to a stepped cup-shaped formation 28 provided with a shoulder 29 and a sleeve portion 30.

The ends of the nut 15 are rotatably mounted by thrust bearings 31 and 32 each of which comprises an inner ball bearing race ring 34 abutting one of the shoulders 26, 29 and mounted on and secured to the tubular shaft 14 and the sleeve portion 30, respectively for rotation with the nut, an outer ball bearing race 35 disposed in the intermediate housing section 12, and ball bearings 36 between the rings 34 and 35.

The bearing rings 34 and 35 are slidably mounted within cylindrical surfaces of the intermediate housing section and are urged towards each other in the manner about to be described. The ring 34 at the right as viewed in FIG. 2B abuts an apertured plate 37 which is engaged by a spring 38 seated on a flanged member 39 within the housing. The other ring 34 at the left is engaged by an annular retainer plug 40 which is screwed into the housing to bias the spring 38 and thereby preload the thrust bearings 31 and 32. The advantage of such an arrangement is that when the bearings are subjected to extremely cold temperature encountered at high altitude thermal contraction of the metallic member is compensated for by the spring whereby relative movement of the parts of the nut and thrust bearing assembly in an axial direction is prevented.

Another feature of this arrangement is that provision is made for locking the plug 40 in its desired position of spring biasing adjustment. As shown in FIGS. 2B and 3 this is accomplished by forming the plug with a plurality of circumferentially spaced holes 41 adapted to receive a pin 42 secured to an apertured plate 44 having radially outwardly extending tabs 45 seated in slots 46 of the housing to prevent rotation of the plate 44 and the plug 40 after these elements have been arranged as shown. The holes 41 also provide means for engaging the plug 40 with a wrench or tool for rotating the same.

In order to facilitate such adjustment, a tubular member 47 formed with internal threads at its inner end constitutes the housing sections 11 and 12, and a coupling member 48 which is part of the housing section 10 is screw threaded onto the inner end of the member 47 to hold the plate 44 in place.

As shown in FIG. 2B, a portion of the tubular shaft 14 extends through rings of the thrust bearing 31 and the sleeve portion 30 extends substantially through the rings of the thrust bearing 32. These portions provide shields for the screw groove 19 to prevent debris and excess dry lubricant from dropping onto the screw groove. Also, since the nut 15 is rotated, radial slits or ports 49 may be provided between the working sections of the screw groove 16 and in the crossover channels (not shown) to allow debris and excess lubricant to fall out of the nut and into the housing cavity. This material can then be removed rather than be left to clog up the nut.

The spindle 18 is coupled to the shaft 17 by an aperture cup 50 fitting over a flange 51 on the spindle and screw threaded and staked to the shaft 17 (FIG. 2B). The shaft 17 is slidably supported by a guide bushing or bearing 52 mounted at the outer end of the housing section 11 (FIG. 2C), and has an actuator rod 54 secured to the free end thereof for imparting linear movement to mechanism to be driven.

In the foregoing described transmission assembly which utilizes a rotating nut and a linear moving translating shaft, there are no local hot spots in the nut due to nonuniform temperatures around the housing diameter. Also, the effect of side loads relative to crossovers is minimized because the crossovers are moved. Furthermore the ballscrew cannot take side loads in the crossover zones, because in those zones the balls are not engaged, and, therefore, there is no support for loads acting on these portions of the nut. Due to rotation of the nut, these zones do not remain in one position for any appreciable length of time. Furthermore, rotation of the nut tends to throw out debris rather than allowing it to settle in stationary areas.

The nut is located axially at the maximum possible distance from the actuator rod 54, whereby any side loads acting on the housing and end moments acting on the actuator rod are transferred to the nut as relatively small pure side loads. These side loads are minimized because the distance between the nut and the guide bushing at the right end of the housing is maximum. In this manner twisting moments are prevented from being transmitted to the nut itself.

From the foregoing description, it will be seen that the present invention provides a ballscrew and nut transmission assembly which is compact and light in weight but yet is sufficiently rugged to withstand the use to which it normally is subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a ballscrew and nut transmission assembly, the combination of a tubular housing having end sections and an intermediate section, a tubular shaft mounted for rotation in one of said end sections, a nut having a screw groove in said intermediate section secured to said tubular shaft for rotation therewith, a second shaft mounted for linear movement in said other end section, a spindle secured to the inner end of said second shaft for movement therewith having a screw groove at one end cooperating with the screw groove of said nut to provide a path for confining ball bearings and having a section at its other end extending into said tubular shaft, thrust bearings at each end of said nut for rotatably mounting said nut in said intermediate housing section, said thrust bearings each including a stationary outer ball bearing race ring mounted at opposite ends of said intermediate housing section and an inner ball bearing race ring secured to said nut for rotation therewith, said outer rings being slidably sounted in said intermediate housing section, a spring positioned in said intermediate housing section at one end thereof to bias said outer rings towards each other, and means in said intermediate housing section at the other end thereof for adjusting the degree of bias of said spring.

2. In an assembly according to claim 1, wherein said means include elements for retaining the same in a given adjusted position.

3. In an assembly according to claim 1, wherein said means comprise a ring screw threaded into said intermediate housing section and engaging one of said outer rings and having a plurality of circumferentially spaced apertures, a pin extending into one of said apertures and a plate secured to said pin and positioned in said intermediate housing section having means cooperating with said intermediate housing section to prevent rotation thereof.

References Cited in the file of this patent

UNITED STATES PATENTS

| | | |
|---|---|---|
| 2,212,572 | McCarthey et al. | Aug. 27, 1940 |
| 2,240,977 | Bryant et al. | May 6, 1941 |
| 2,351,211 | Hodgson | June 13, 1944 |
| 2,496,740 | Morey | Feb. 7, 1950 |
| 2,660,026 | Geyer | Nov. 24, 1953 |
| 2,740,302 | Keyser | Apr. 3, 1956 |
| 2,869,386 | Hoover | Jan. 20, 1959 |